United States Patent [19]
Cohen et al.

[11] Patent Number: 6,072,953
[45] Date of Patent: Jun. 6, 2000

[54] APPARATUS AND METHOD FOR DYNAMICALLY MODIFYING CLASS FILES DURING LOADING FOR EXECUTION

[75] Inventors: Geoffrey Alexander Cohen, Durham; Richard Adam King, Cary, both of N.C.

[73] Assignee: International Business Machines Corporation, Armonk, N.Y.

[21] Appl. No.: 08/941,815

[22] Filed: Sep. 30, 1997

[51] Int. Cl.[7] ...................................................... G06F 9/45
[52] U.S. Cl. ............................................................ 395/710
[58] Field of Search .................................... 395/705, 704, 395/710, 708; 380/4

[56] References Cited

U.S. PATENT DOCUMENTS

| | | | |
|---|---|---|---|
| 5,339,430 | 8/1994 | Lundin et al. | 709/305 |
| 5,740,469 | 4/1998 | Yen et al. | 395/704 |

OTHER PUBLICATIONS

Jshrink Eastridge Technology, "Jshrink:Java Shrinker and Obfuscator", http://www.e-t.com/jshrinkdoc.html.
"The OM Project", http://www.research.digital.com/wrl/projects http://www.research.digital.com/wrl/projects/om/om.html.
"Mocha, the Java Decompiler", http://www.brouhaha.com/~eric/computers/mocha.html.
"Hashjava", http://www.sbktech.org/hashjava.html.
Lee, Han Bok, "Bit: Bytecode Instrumenting Tool", Thesis submitted to the Graduate School of the Univ. of Colorado, 1997.
Keene, Sonya E., "Object–Oriented Programming in Common Lisp, A Programmer's Guide to CLOS", ISBN 0–201–17589–4, Addison–Wesley Publishing Company, pp. 140–143.
Digital Western Research Laboratory, Palo Alto, CA, "WRL Research Report 92/3: Systems for Late Code Modification" by David W. Wall, May 1992.
Digital Western Research Laboratory, Palo Alto CA, "WRL Research Report: Link–time Code Modification" by David W. Wall Sep. 1989.
David Wall, WRL Research Report 92/3, Link–Time Code Modication, Dgital, May 1989, p 1–6.

*Primary Examiner*—Alvin E. Oberley
*Assistant Examiner*—George Opie
*Attorney, Agent, or Firm*—Jeanine S. Ray-Yarletts; Marcia L. Doubet

[57] ABSTRACT

The present invention discloses a method, computer program product, and system for dynamically and programmatically modifying the semantics and/or logic of class files as they are being loaded for execution. The present invention permits a user to write a control file specifying in a programmatic manner the changes to be applied to class files and the conditions for carrying out the changes. As the class files are loaded, they are analyzed for the desired conditions and if the conditions are found, the control file is applied to them to effect the appropriate changes according to the user's control file.

9 Claims, 5 Drawing Sheets

APPARATUS AND METHOD FOR DYNAMICALLY MODIFYING CLASS FILES DURING LOADING FOR EXECUTION

FIELD OF THE INVENTION

The present invention relates generally to computer programming methods and systems, and, in particular, to methods and systems for modifying compiled programs dynamically and programmatically, without resort to source code.

BACKGROUND OF THE INVENTION

Computer languages and environments generally employ three types of methods for translating source code written by a programmer into machine instructions. In interpreted environments, each statement or command of source code is translated to machine language as the program runs, one or a few statements at a time. An example of an interpreted environment is the Restructured Extended Executor (REXX) language specified by IBM and supported on IBM's Virtual Machine (VM) and OS/2™ operating systems. In compiled environments, each part of a program is translated into machine code and the several parts are linked together into a machine code executable file for a specific machine before the program is distributed or run. Compiled environments include C, C++, FORTRAN, and most mainstream programming languages. A third type of environment is a virtual machine environment as shown in FIG. 1, in which a program is translated 105 into a pseudo-machine code 115, which runs on a machine specification which may be implemented in a hardware machine or may be implemented as a "virtual machine" 125 in software on several hardware and operating system platforms 130, before being run. This third environment allows the translated program to be run on every hardware and operating system environment on which there is a compliant implementation of the virtual machine. The present invention is directed toward virtual machine environments, the most prominent of which is the Java™ environment, recently released by Sun Microsystems, in which the pseudo-machine code is also called bytecode, and the files that contain the bytecode and other information needed to load and run programs are called class files. The terms bytecode and class file are used generically herein to specify, respectively, the pseudo-machine code to be interpreted by a virtual machine environment and the files which contain bytecodes and other information needed to load and run programs in virtual machine environments, respectively. Use of these terms is not intended to restrict the invention to the present JavaTm architecture, or to the Java™ language.

In virtual machine environment systems, programs and program parts are usually distributed in class files, with the source code not generally being made available. In some environments it may be desirable to derive the original source code from the class files, and in the Java™ world there are several tools available to do this derivation. These tools include a tool named Mocha, written by the late Hanpeter van Vliet and available at http://www.brouhaha.com/~eric/computers/mocha.html, and another tool named D-Java, written by Shawn Silverman and available at http://home.cc.umanitoba.ca/~umsilve1/djava/. Many authors of Java™ programs do not want their class files to be translated back to source code, a process known as disassembly. These authors may resort to another set of tools available in the Java™ world called obfuscators, which operate as shown in FIG. 3. Obfuscators modify Java™ class files 300 to make them difficult to understand if they are disassembled using tools like the Mocha or D-Java disassembers. An example of an obfuscator is the hashjava tool, by KB Sriram and available at http://webx.best.com/~kbs/hashjava.html. Obfuscators do not modify the logic and/or semantics of Java™ class files; they perform simple transformations on names to make them harder to understand, and they do not allow the user flexibility to do anything else with class files that would change their logic or semantics. Some obfuscators do not allow the user flexibility to affect how the class files are transformed, and others such as the hashjava tool only allow the user the capability to specify simple transformations 320 that will be performed on the names.

One may desire to modify the logic and/or semantics of class files without having the original source available. For example, in the area of security, one may wish to have a capability to "scrub" class files to prevent them from executing any instructions that may cause a security risk. In the prior art, the Java™ Virtual Machine (JVM) 125 has a "bytecode verifier" function that examines class files to verify that they are not performing risky operations. However the bytecode verifier does not have any capability for modifying class files found to be troublesome—it simply refuses to load them.

Another area in which one may desire to modify the logic or semantics of class files with no source code available is to enable different pieces of a program to be dynamically distributed across several computers, without requiring the programmer to be aware of such distribution, as in the invention described in the copending, commonly assigned patent application having Ser. No. 08/852,263, entitled "A Process for Running Objects Remotely," filed on May 6, 1997.

Further reasons to modify class file logic or semantics include, but are not limited to, performance optimization, performance and error tracing and notification, etc.

Digital Equipment Corporation's Analysis Tools with OM (ATOM) tool provides for programmatic modification of compiled code for the compiled environment without resort to source code. The ATOM tool is designed to add calls to analysis and measurement routines, not to alter the logic and semantics of a program. Additionally, as the ATOM tool is designed to operate in the compiled environment, it has no capabilities for modifying compiled code as it is loaded to be run, and the ATOM tool works only on compiled code for Digital Equipment Corporation's supported machines. More information on the ATOM tool is available at http://www.research.digital.com/wrl/projects/om/om.html.

Using the teachings of the prior art, there are several unappealing methods available for modifying class files for virtual machine environments such as the Java™ environment.

1. Class file modification could be done by hand, as shown in FIG. 2, using the disassemblers of the prior art 205 to derive source code 210, modify it by hand 215, and recompile 225 it into a class file 230 again. If one is particularly skilled in the art of the language being used and is familiar with the formats of bytecodes and class files, one may also directly manipulate class files by hand (235 and 240). However, this process is tedious and error prone, and particularly inefficient if many parts must be modified in similar ways that could be described programmatically. Furthermore, one may desire to do class file modification dynamically, as the bytecode files are being loaded for execution, especially if said bytecode files are being loaded from a remote server, and therefore are not available to the local machine before they are to be run. It obviously would not be desirable to do such dynamic, load-time modification by hand.

2. Class file modification could be done with a tool which makes specific transformations, as shown in FIG. 3, for example changing commands that may pose a security risk into harmless or ineffective commands. Such a tool would work similarly to an obfuscator, searching for specific sequences in the class file and changing them to some other sequence. Such tools may even allow for the use of "profiles" 320 or other methods of exporting to the user 325 choices such as what sequences are to be changed into what other sequences, or giving a mapping from an existing sequence to a new sequence that is to replace the existing sequence. Such a method would simply represent the automation of the first method mentioned above.

3. Class file modification could be done with a program such as the ATOM tool, which would allow a programmatic and flexible interface for making changes to the compiled code. While a program such as the ATOM tool would allow the user flexibility to add and change compiled code in a programmatic way, such a tool contemplates adding analysis and measurement routines, and does not contemplate modifications in the logic or semantics of the modified code. Also, the ATOM tool does not teach or suggest modifying code in an automatic fashion as such code is being loaded for execution, since the concept of a class loader is absent in the compiled environments for which the ATOM tool is designed.

Hence, none of the prior art teaches or suggests a method for doing bytecode modification at load time in a programmatic way.

OBJECT OF THE INVENTION

It is the object of the present invention to provide a method for programmatically modifying class files without need of resorting to their source files, and to perform said modification of class files dynamically, as said files are being loaded for execution.

SUMMARY OF THE INVENTION

The present invention includes a method, system, and program product for modifying class files dynamically and programmatically, without having the source code used to produce them available, and without needing to use a disassembler to derive the source code.

As shown in FIG. 1, the class loader 120 is the component of a virtual machine environment which retrieves code to be executed. The code may all be loaded as the program initializes, or may be loaded on an as-needed basis. The code may be loaded from local (e.g., disk drive) or remote (e.g., over the Internet) storage. In either case, the class loader 120 passes the class file 115 to the virtual machine 125, which performs the bytecode verifier function then loads requested code into the virtual machine 125 for execution.

One may desire to modify a class file as it is being loaded. This could be done for reasons that include, but are not limited to, security, performance enhancement, adding additional function or instrumentation to the byte codes, or changing the way the components of a program interact. The present invention provides a method, system, and computer program product for accomplishing said modification of class files as they are being loaded.

The present invention extends the class loader to include a programmatic class file modification function. This function is controlled by a program written by a user, which permits the user virtually unlimited control over the types of modifications to be performed. When the extended class loader obtains a class file to be loaded, it passes the class file to an interface implementing the process disclosed in the present invention. The disclosed process determines, using a decision specification provided by the user, if modifications are needed to the class file, and if so they are applied according to a modification specification provided by the user. After the transformations are complete, the modified class file is returned to the normal class loader processing and loaded as is normally done. The result of this process is that the user's desired transformations may be automatically applied to all class files loaded and run in the virtual machine.

BRIEF DESCRIPTION OF THE DRAWINGS

The preferred embodiment of the present invention will be herein described in more detail with reference to the drawings, in which.

DETAILED DESCRIPTION OF THE PREFERRED EMBODIMENT

Figure 1:
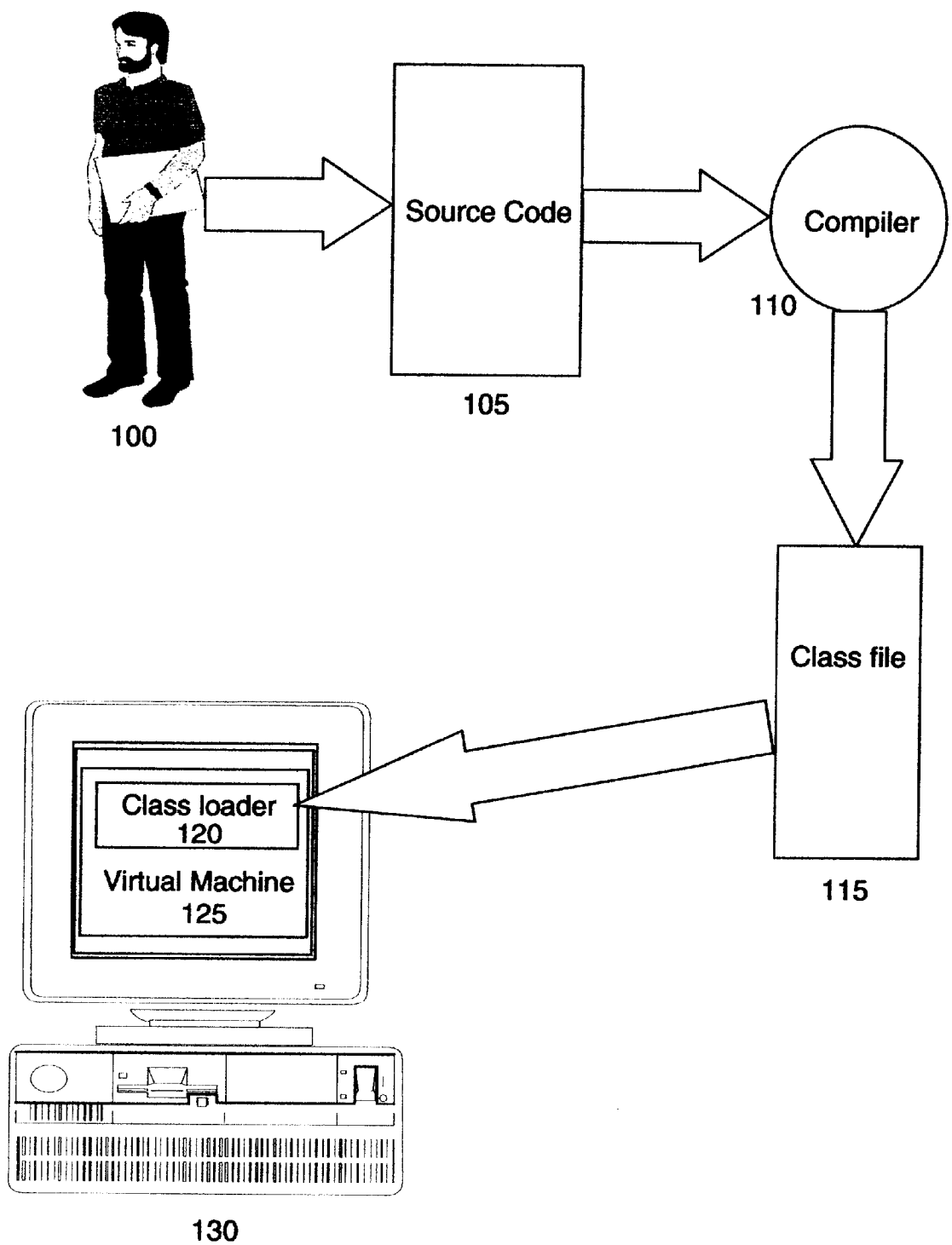
FIG. 1 depicts a general overview of the development and loading of code in a prior art virtual machine environment.
Figure 2:
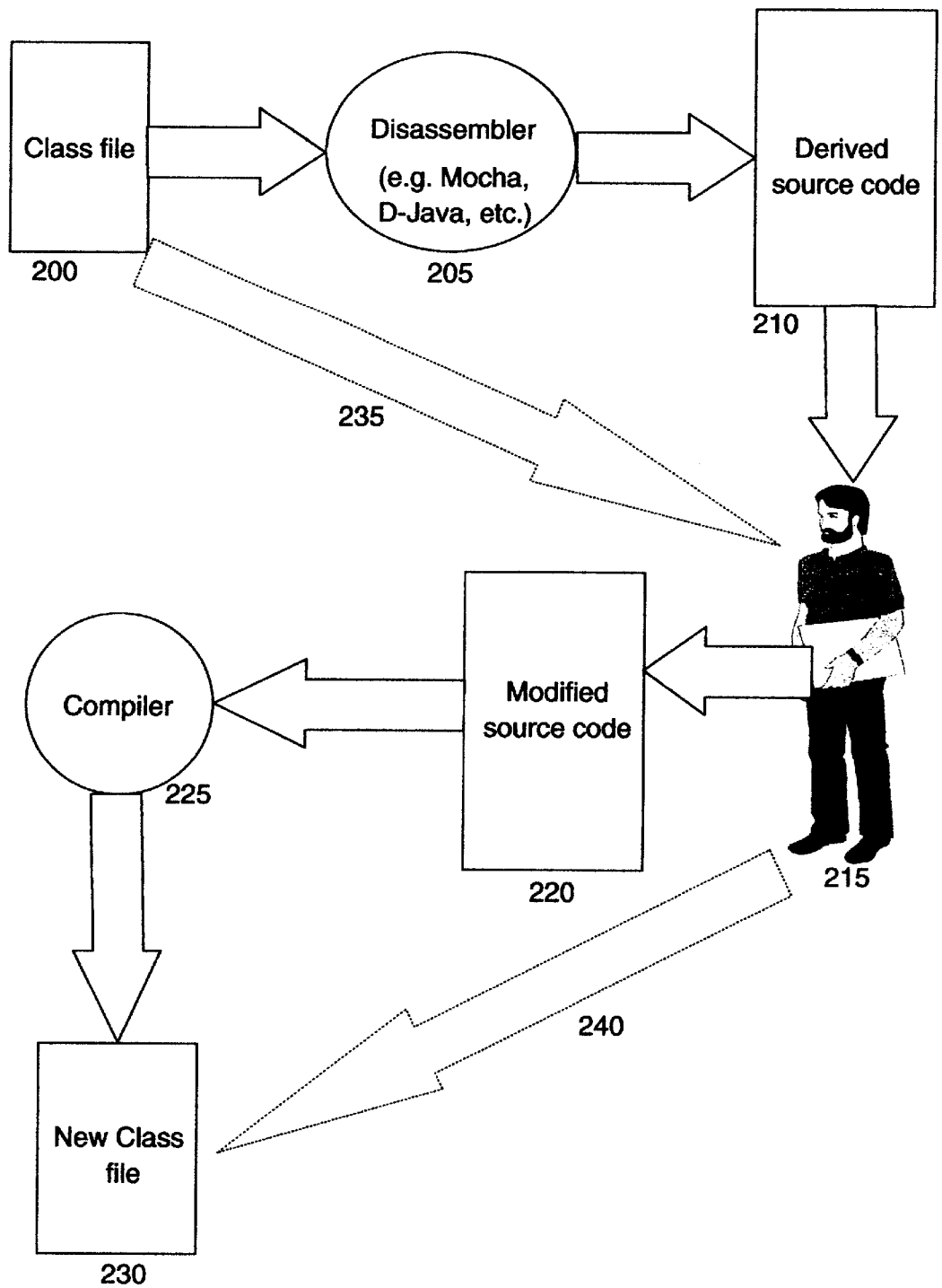
FIG. 2 depicts the prior art methods for modifying a class file when the original source code is not available.
Figure 3:
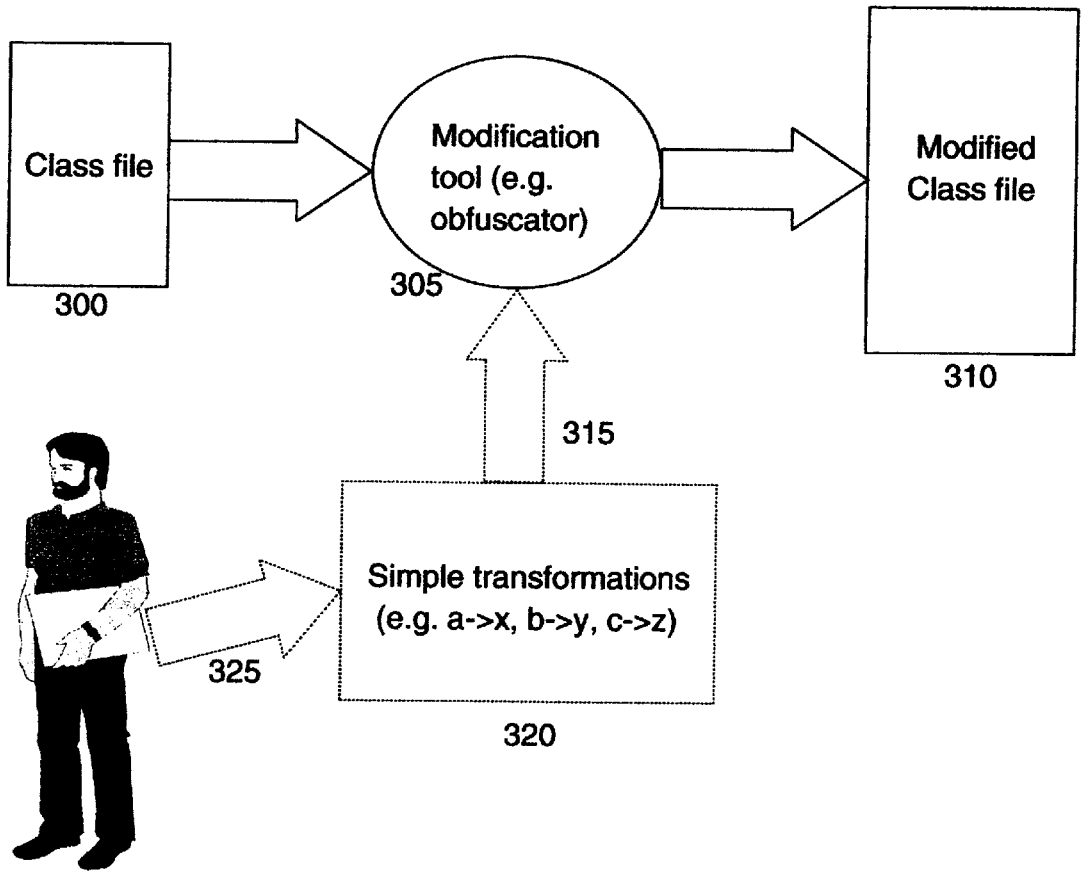
FIG. 3 depicts the prior art methods for using tools to make modifications to a class file when the original source code is not available.

The present invention is applicable to any dynamic modification of bytecodes or class files as they are loaded to be executed. The Java™ Object Instrumentation Environment (JOIE) of the preferred embodiment utilizes the Java™ programming environment although the present invention is not limited to the Java™ environment and the application of this invention to other virtual machine environments would be apparent to one skilled in the art. The preferred embodiment of the present invention assumes that the user has available Java™ class files which have been compiled with a compiler that adheres to the Java™ standard published by Sun Microsystems and described in *The Java Virtual Machine Specification*, by Tim Lindholm and Frank Yellin, Addison Wesley, 1997. The JOIE of the present invention assumes the class files may be loaded for execution, but the source code for the class files may not be available, or, if the source code is available, the user does not wish to modify and recompile it. It is further assumed that the modifications desired by the user may be expressed programmatically.

The user identifies the modifications he wishes to have performed in class files by building a control file. The control file contains a specification of the modifications to be performed, written as a Java™ class which implements a ClassTransformer interface. A class implementing ClassTransformer provides two methods:

1) select: this method returns true if the class whose name is provided by the caller is a valid target for transformation. The user may write this class in any way he desires, including but not limited to: returning true for all classes, returning true for all classes named in a list retrieved from a file or elsewhere, returning true for all classes that are not built into the Java™ environment, etc.

2) transform: this method performs the actual transformation. Note that no restriction is placed upon the mechanism of the transformation, and the mechanism of the transformation is not a subject of the present invention. The transform method accepts a class file as bytes, and returns a possibly-modified class file as bytes.

The JOIE of the preferred embodiment provides methods for class file analysis and modification, which the user may, but is not required to, use in his select and transform methods. Some of these methods are derived from methods provided by Sun Microsystems' standard Java™ environment in the java.lang.Class class and in the java.lang.reflect class hierarchy (which are documented in many generally available sources, including *Java in a Nutshell*, second edition, by David Flanagan, O'Reilly and Associates, May 1997), and others are added by the JOIE of the preferred embodiment, and would be straightforward for one skilled in the Java™ art (with reference to *The Java Virtual Machine Specification* book cited above) to create. These provided analysis and modification methods reside in a new class provided by JOIE named Mirror. The user may elect not to use the Mirror class, and may substitute some other methodology for class file modification into the transform method.

The Java™ program method of writing the control file allows virtually unlimited flexibility to the user. The user may make use of Java™ control statements, such as conditionals, to specify when certain changes are to be made, and how they are to be made.

The contents of a hypothetical control file, which a user might create to cause a method to obtain the value of the first field in a class to be added to the class, are here illustratively shown:

```
class AddGetter implements ClassTransformer {
    boolean select(String name) {
        return true;
    }
    byte[ ] transform(byte[ ] bytes). {
        Mirror mirror = new Mirror(bytes) ;
        Modifier mod = new Modifier( ) ;
        mod.set(Modifier.PUBLIC) ;
        Field[ ] fields = mirror.getFields( ) ;
        String fieldname = fields[0].getName( ) ;
        String methname = "get" + fieldname;
        String desc = "( )I";
        short index = (short)mirror.findFieid(fieldname) ;
        byte[ ] code = new byte[5] ;
        code[0] = (byte) 0x2a;    // aload_0
        code[1] = (byte) 0xb4; // getfield
        code[2] = (byte) (index >> 8) ;
        code[3] = (byte) (index & 0xff) ;
        code[4] = (byte) 0xac; // ireturn
        short code_index = (short)mirror.find("Code") ;
        Attribute_Code attc = new Attribute_Code((short)1, (short)2,
            code_index, code) ;
        mirror.addMethod(mod, methname, desc, attc) ;
        return mirror.getBytes( ) ;
    }
}
```

This illustrative control file will perform its transformation on all class files loaded, as the select method always returns true. The transform method gets the list of fields in the class using Mirror's getFields method, obtains the name of the first field returned using the getName method of the java.lang.Field class, and then uses Mirror class methods to locate said first field and to add a method to the class to get the value of said first field.

The class loader component of the Java™ Virtual Machine (JVM) which is specified by Sun Microsystems is user-extendible, with extensions made via the well-known technique of creating sub-classes of the class loader. The preferred embodiment of the present invention extends the class loader to contain an interface named ClassTransformer.

Users register ClassTransformers with their instance of the extended ClassLoader. The user's class loader queries (by calling the select method) whether or not the class is a valid target for transformation. If the class is a valid target for transformation, the transformation is applied by calling the transform method.

The user's class loader could implement additional straightforward extensions, for example to allow a series of transformations or to always provide an additional transformation to transformed classes which mark them as implementing the interface Transformed. The additional Transformed interface would have no semantic effect, but could be used by user code to detect whether the class has in fact been modified.

Figure 4:
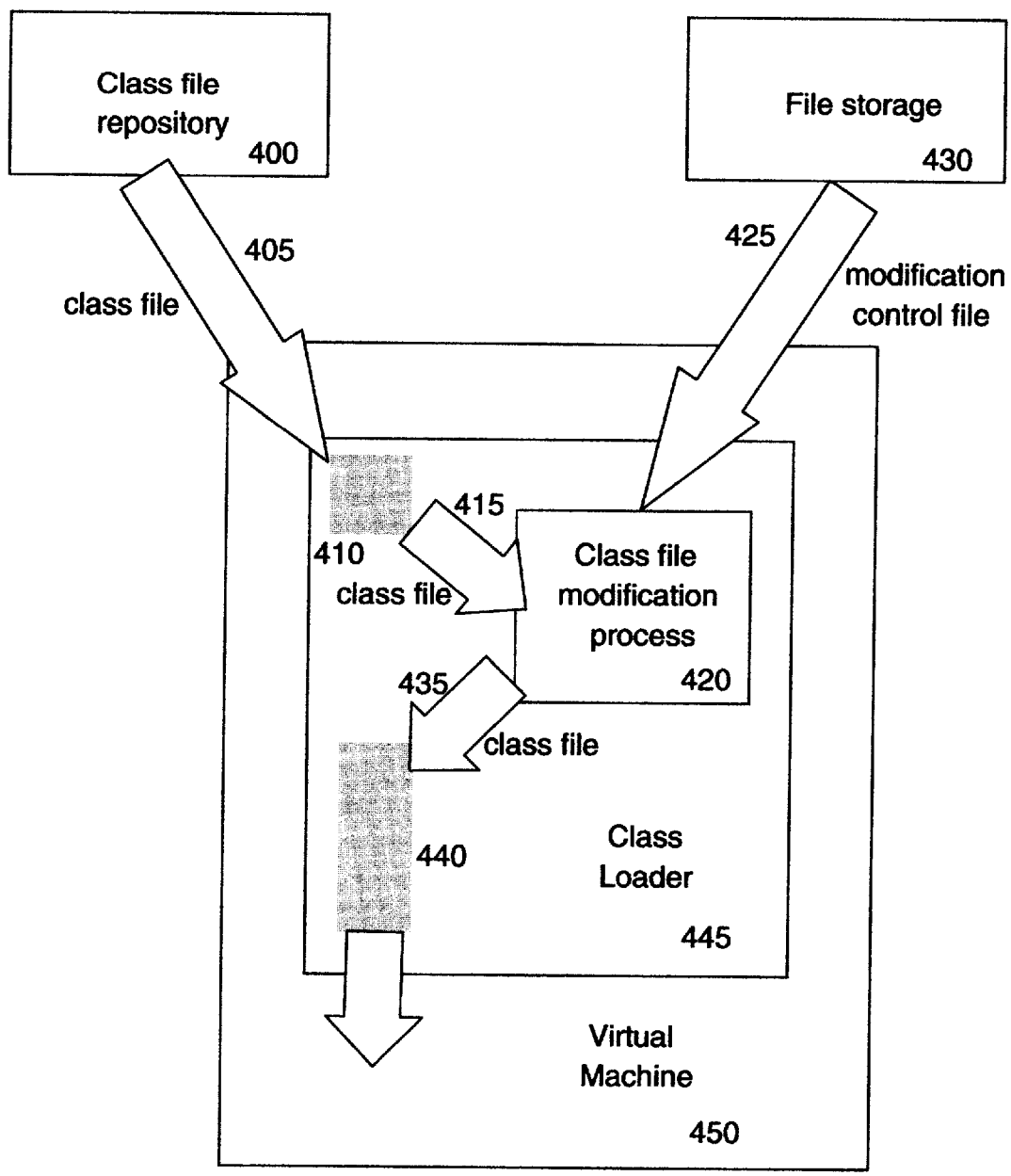
FIG. 4 depicts loading and modification of a class file using the preferred embodiment of the present invention when the original source is not available, using a programmatic API to specify the modifications to be made.
Figure 5:
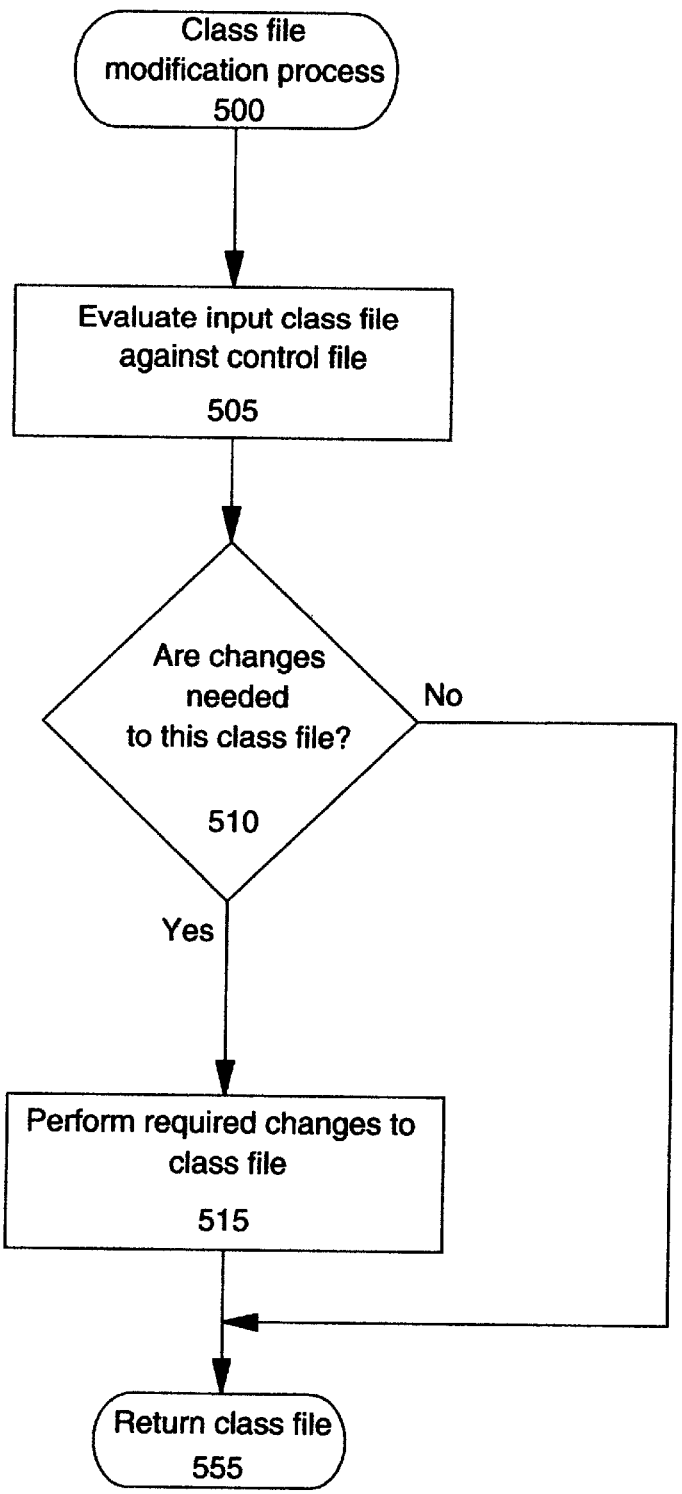
FIG. 5 depicts in more detail the class file modification process shown in FIG. 4.

FIGS. 4 and 5 depict the extended class loader 445 of the preferred embodiment (FIG. 5 depicts in more detail the process resident in the ClassTransformer interface 420). A class file to be loaded is obtained 405 from its repository 400. The repository may be locally resident or accessed through a network. Before the class loader does any processing on the class file, its contents are passed 415 to the ClassTransformer interface 420, which calls the user-provided select method to determine if the user-provided transform method should be run 505. If the user-provided select method returns true 510, the class file is passed to the user-provided transform method, which performs any modifications that may be required 515. Once the modified class file is returned from the JOIE extended class loader 435 and 555, it is loaded normally by the linking process and treated as if it had been originally received in its modified form 440.

What is claimed is:

1. A computer-implemented method for enabling programmatic semantic modifications to class files as said files are loaded for execution by a loading and execution process, said method comprising the steps of:

providing an extended class loader;

receiving, by said extended class loader, a request for loading a selected one of said class files, wherein said request is generated from an executing application program and wherein said selected class file contains executable program code to be executed as a part of said application program;

retrieving, by said extended class loader, said selected class file;

determining, by evaluating one or more specified conditions from a stored control file, whether said retrieved class file is to be semantically modified prior to an execution of said executable program code;

if any of said conditions are met, performing the steps of:
  applying one or more semantic modifications to said executable program code in said retrieved class file by executing one or more stored transformations associated with said stored conditions, creating a dynamically modified class file; and
  delivering said dynamically modified class file as a result of said request; and if none of said conditions are met, delivering said retrieved class file as said result of said request.

2. The computer-implemented method as claimed in claim 1, wherein said class files are Java class files.

3. The computer-implemented method as claimed in claim 1, wherein said extended class loader extends a Java class loader.

4. A computer program product for enabling programmatic semantic modifications to class files as said files are loaded for execution by a loading and execution process, said computer program product comprising:

a computer-readable storage medium having computer-readable program code means embodied in said medium, said computer-readable program code means comprising:

computer-readable program code means for providing an extended class loader;

computer-readable program code means for receiving, by said extended class loader, a request for loading a selected one of said class files, wherein said request is generated from an executing application program and wherein said selected class file contains executable program code to be executed as a part of said application program;

computer-readable program code means for retrieving, by said extended class loader, said selected class file;

computer-readable program code means for determining, by evaluating one or more specified conditions from a stored control file, whether said retrieved class file is to be semantically modified prior to an execution of said executable program code;

if any of said conditions are met, computer-readable program code means for:

applying one or more semantic modifications to said executable program code in said retrieved class file by executing one or more stored transformations associated with said stored conditions, creating a dynamically modified class file, and delivering said dynamically modified class file as a result of said request; and if none of said conditions are met, computer-readable program code means for delivering said retrieved class file as said result of said request.

5. The computer program product as claimed in claim 4, wherein said class files are Java class files.

6. The computer program product as claimed in claim 4, wherein said extended class loader extends a Java class loader.

7. A computer system for enabling programmatic semantic modifications to class files as said files are loaded for execution by a loading and execution process, said system comprising:

means for providing an extended class loader;

means for receiving, by said extended class loader, a request for loading a selected one of said class files, wherein said request is generated from an executing application program and wherein said selected class file contains executable program code to be executed as a part of said application program;

means for retrieving, by said extended class loader, said selected class file;

means for determining, by evaluating one or more specified conditions from a stored control file, whether said retrieved class file is to be semantically modified prior to an execution of said executable program code;

if any of said conditions are met, means for:

applying one or more semantic modifications to said executable program code in said retrieved class file by executing one or more stored transformations associated with said stored conditions, creating a dynamically modified class file; and delivering said dynamically modified class file as a result of said request; and if none of said conditions are met, means for delivering said retrieved class file as said result of said request.

8. The computer system as claimed in claim 7, wherein said class files are Java class files.

9. The computer system as claimed in claim 7, wherein said extended class loader extends a Java class loader.

* * * * *